United States Patent
Lepore et al.

(10) Patent No.: US 7,532,628 B2
(45) Date of Patent: May 12, 2009

(54) COMPOSITE CONTROLLER FOR MULTIMEDIA SESSIONS

(75) Inventors: Michael P. Lepore, Marlborough, MA (US); Stephen R. Quatrano, Lexington, MA (US); Paul H. Kyzivat, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 243 days.

(21) Appl. No.: 10/334,546

(22) Filed: Dec. 30, 2002

(65) Prior Publication Data
US 2004/0125756 A1   Jul. 1, 2004

(51) Int. Cl.
*H04L 12/28* (2006.01)
*H04L 12/56* (2006.01)

(52) U.S. Cl. .................................... 370/401
(58) Field of Classification Search .......... 370/260, 370/261, 400, 401, 431; 709/227, 228
See application file for complete search history.

(56) References Cited

U.S. PATENT DOCUMENTS

| | | | |
|---|---|---|---|
| 6,256,389 B1 * | 7/2001 | Dalrymple et al. | 370/352 |
| 6,430,176 B1 * | 8/2002 | Christie, IV | 370/355 |
| 6,512,818 B1 * | 1/2003 | Donovan et al. | 379/88.18 |
| 6,549,621 B1 * | 4/2003 | Christie et al. | 379/230 |
| 6,665,537 B1 | 12/2003 | Lioy | 455/435 |
| 6,678,735 B1 * | 1/2004 | Orton et al. | 709/230 |
| 6,738,390 B1 * | 5/2004 | Xu et al. | 370/467 |
| 6,771,639 B1 * | 8/2004 | Holden | 370/352 |
| 6,985,961 B1 * | 1/2006 | Ramsayer et al. | 709/238 |
| 7,299,286 B2 * | 11/2007 | Ramsayer et al. | 709/228 |
| 2002/0075303 A1 * | 6/2002 | Thompson et al. | 345/751 |
| 2002/0129093 A1 | 9/2002 | Donovan et al. | 709/203 |
| 2003/0023730 A1 * | 1/2003 | Wengrovitz et al. | 709/227 |
| 2003/0135569 A1 * | 7/2003 | Khakoo et al. | 709/206 |
| 2004/0081159 A1 * | 4/2004 | Pan et al. | 370/395.2 |
| 2006/0168303 A1 * | 7/2006 | Oyama et al. | 709/231 |

FOREIGN PATENT DOCUMENTS

| | | |
|---|---|---|
| WO | WO 01/01660 A1 | 1/2001 |
| WO | WO 01/05109 A1 | 1/2001 |

OTHER PUBLICATIONS

M. Handley and V. Jacobson, "SDP: Session Description Protocol," *The Internet Society*, Apr. 1998, 42 pages.

J. Rosenberg and H. Schulzrinne, "Models for Multi Party Conferencing in SIP," Internet Engineering Task Force, Internet Draft, Nov. 17, 2000, 22 pages.

Rosenberg et al., "Third Party Call Control in SIP," *Internet Engineering Task Force*, Internet Draft, Nov. 22, 2000, 15 pages.

(Continued)

*Primary Examiner*—Kevin C Harper
(74) *Attorney, Agent, or Firm*—Baker Botts L.L.P.

(57) ABSTRACT

A method for managing a multimedia session includes receiving a request to initiate a multimedia session, which includes first media and second media. The method further includes establishing a first delegated session with a first device to communicate the first media, and associating the first delegated session with the multimedia session.

16 Claims, 7 Drawing Sheets

OTHER PUBLICATIONS

Handley et al., "SIP: Session Initiation Protocol," *Internet Engineering Task Force*, Internet Draft, Nov. 24, 2000, 171 pages.

R. Sparks, "SIP Call Control—Transfer," *Internet Engineering Task Force*, Internet Draft, Feb. 26, 2001, 22 pages.

Rosenberg et al., "An Application Server Component Architecture for SIP," *Internet Engineering Task Force*, Internet Draft, Mar. 2, 2001, 39 pages.

Johnston et al., "SIP Service Examples," *Internet Engineering Task Force*, Internet Draft, Mar. 2001, 96 pages.

Jim Strom, "Netmeeting," XP-002280571, http://www.gap.g-ming.net.uk/Netmeeting3.html @ the Internet, Nov. 17, 1999, 2 pages.

Jonathan Davidson et al., "Voice over IP Fundamentals," XP-002280572, *Cisco Press*, 2000, 21 pages.

PCT International Search Report in International Application No. PCT/US 03/38183, dated Jun. 2, 2004, 7 pages.

State IP Office of the People's Republic of China, The First Office Action, Filing No. 200380108058.8, 7 pages, Sep. 12, 2008.

* cited by examiner

| DEVICE ADDRESS | MEDIA TYPE | ACTIVE SESSION | ASSOCIATED MASTER SESSION |
|---|---|---|---|
| 310 { 1.2.3.4 | VOICE | 1 | 1 |
| 1.2.3.5 | VIDEO | 2 | 1 |
| 312 — 1.2.3.1 (LOCAL) | INSTANT MESSAGE | 0 | 0 |

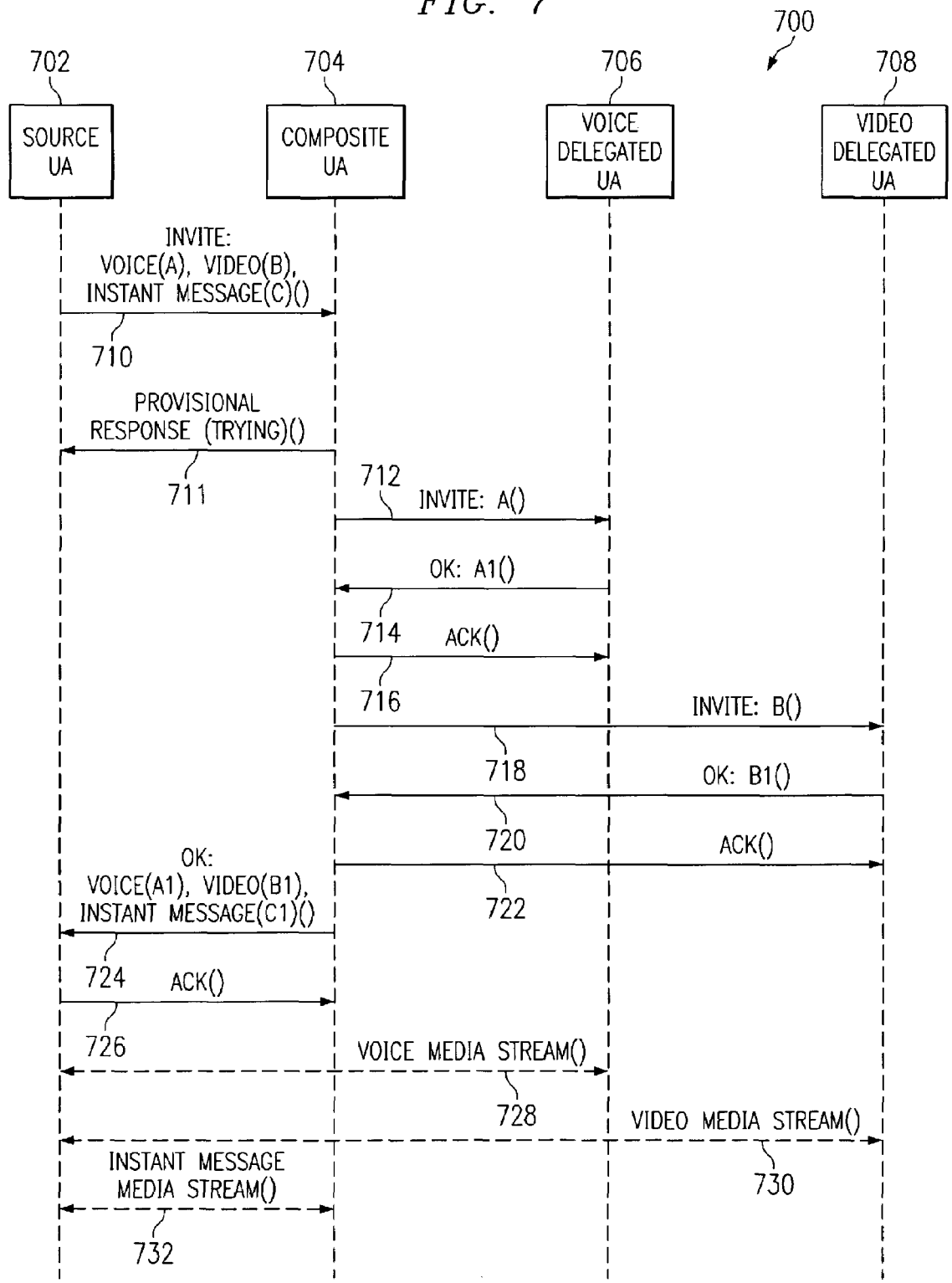

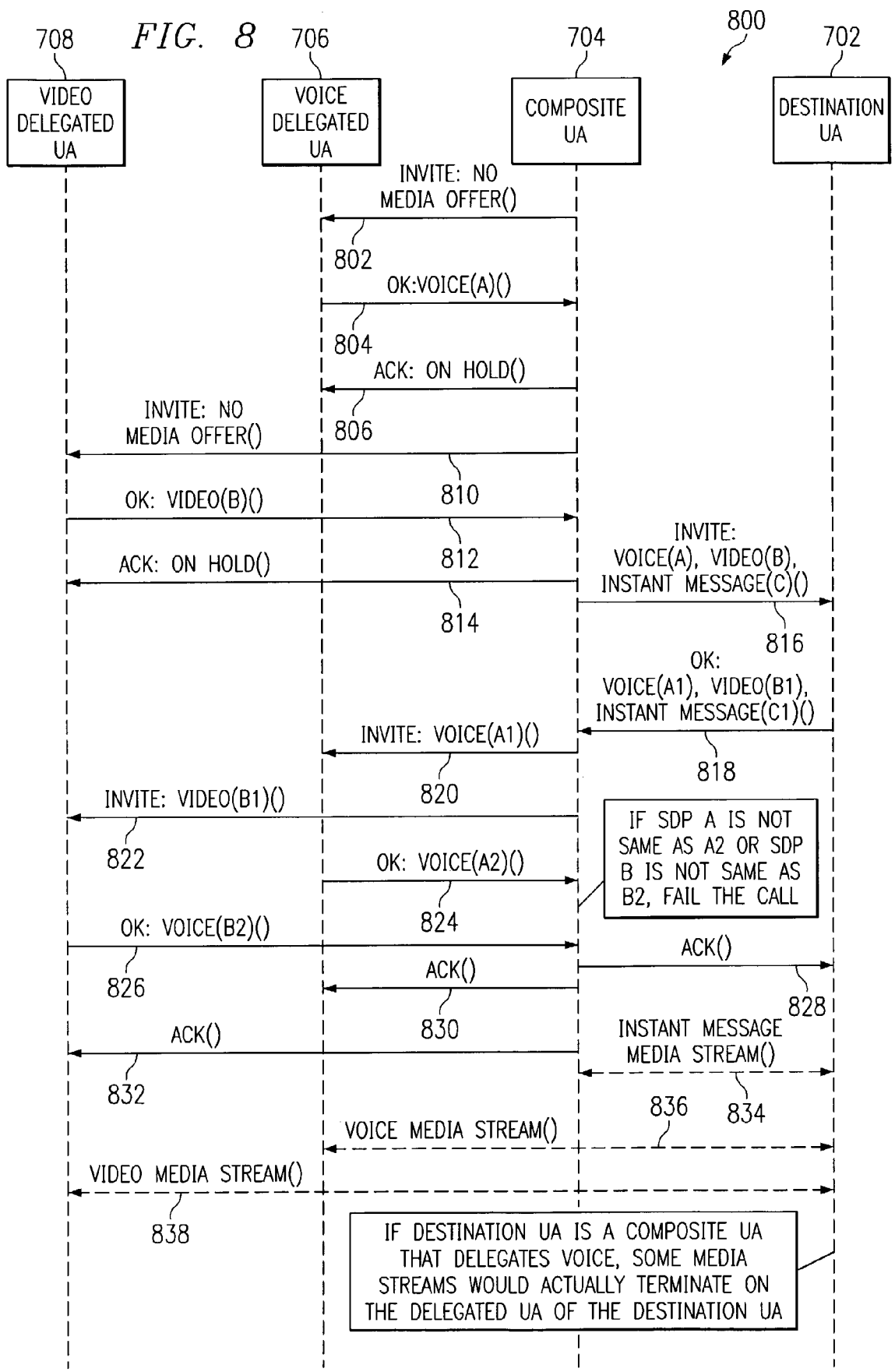

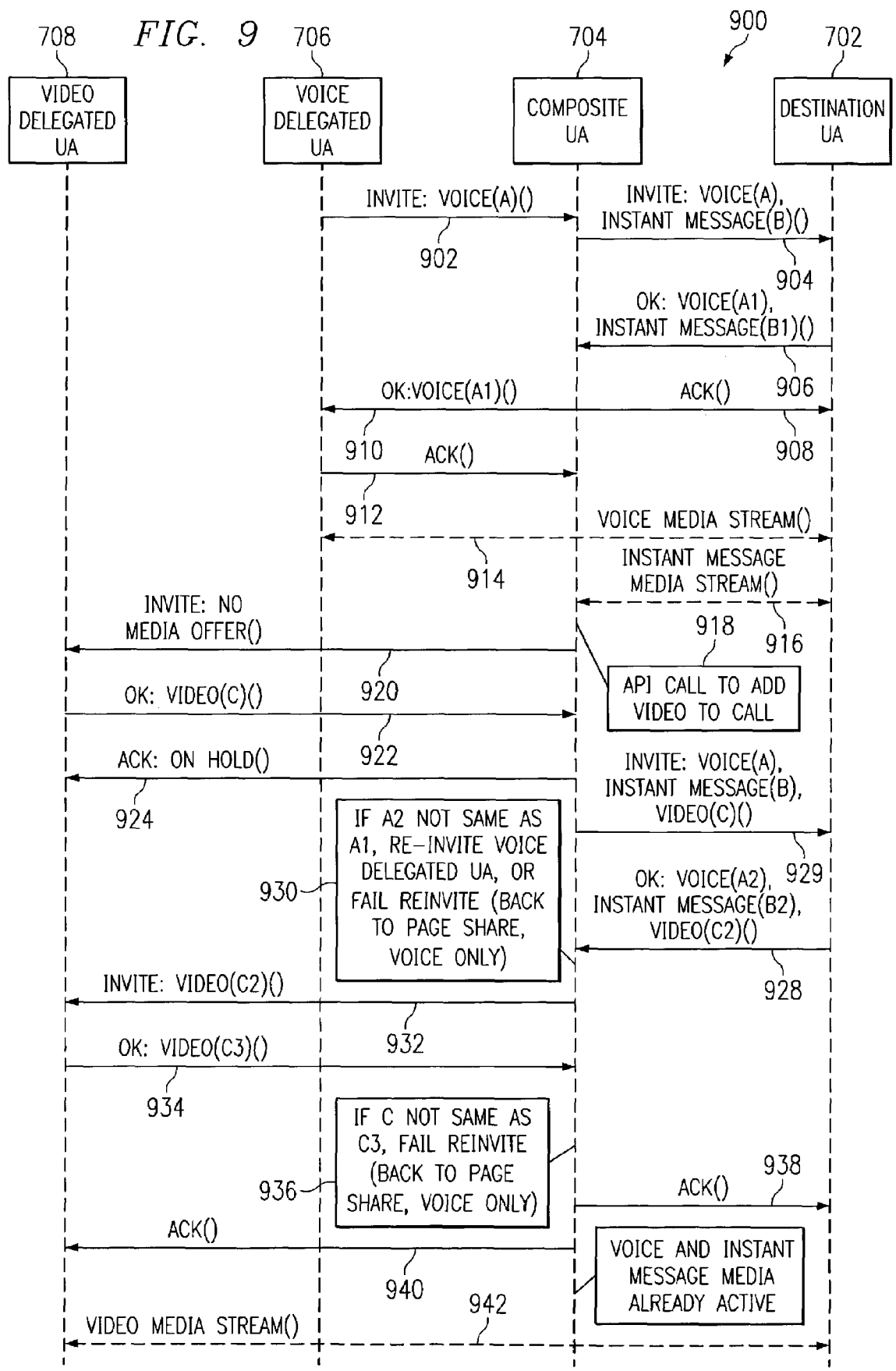

COMPOSITE CONTROLLER FOR MULTIMEDIA SESSIONS

TECHNICAL FIELD OF THE INVENTION

This invention relates in general to telecommunication systems, and more particularly to a composite controller for multimedia sessions.

BACKGROUND OF THE INVENTION

Decentralized communication protocols, such as Session Initiation Protocol (SIP), allow communication sessions without the need of centralized call control. Such communication protocols allow devices to exchange media with one another directly, rather than through an intermediary, such as a call manager. Each device establishes an independent control and media stream with its peers.

SUMMARY OF THE INVENTION

In accordance with the present invention, the disadvantages and problems associated with user agents for decentralized communication protocols have been substantially reduced or eliminated. In particular, certain embodiments of the present invention provide a composite controller that handles a multimedia session that involves delegated media sessions with one or more user devices. This provides a method for allowing multiple media devices to contribute to a single multimedia session.

In accordance with one embodiment of the present invention, a method for managing a multimedia session includes receiving a request to initiate a multimedia session, which includes first media and second media. The method further includes establishing a first delegated session with a first device to communicate the first media, and associating the first delegated session with the multimedia session.

In accordance with another embodiment of the present invention, a composite controller includes a first interface, a second interface, and a processor. The first interface receives a request to initiate a multimedia session having first and second media. The second interface establishes a delegated session with a delegated user agent to exchange the first media with the delegated user agent. The processor associates the first delegated session with the multimedia session.

Important technical advantages of certain embodiments of the present invention include increasing the variety of media and dedicated specialized devices available for distributed communication protocols. The use of composite controllers allows the communicative capabilities of many devices to be incorporated into the same communication session without requiring that each type of device establish a separate communication connection. This increases the overall efficiency and reduces complexity of establishing and controlling multimedia connections.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 7 is a call flow diagram for receiving a SIP request for a multimedia session at a composite controller;

FIG. 8 is a call flow diagram for initiating a multimedia session at a composite controller using SIP; and FIG. 9 is a call flow diagram for initiating a multimedia session at a device docked to a composite controller running SIP.

DETAILED DESCRIPTION OF THE INVENTION

Figure 1:
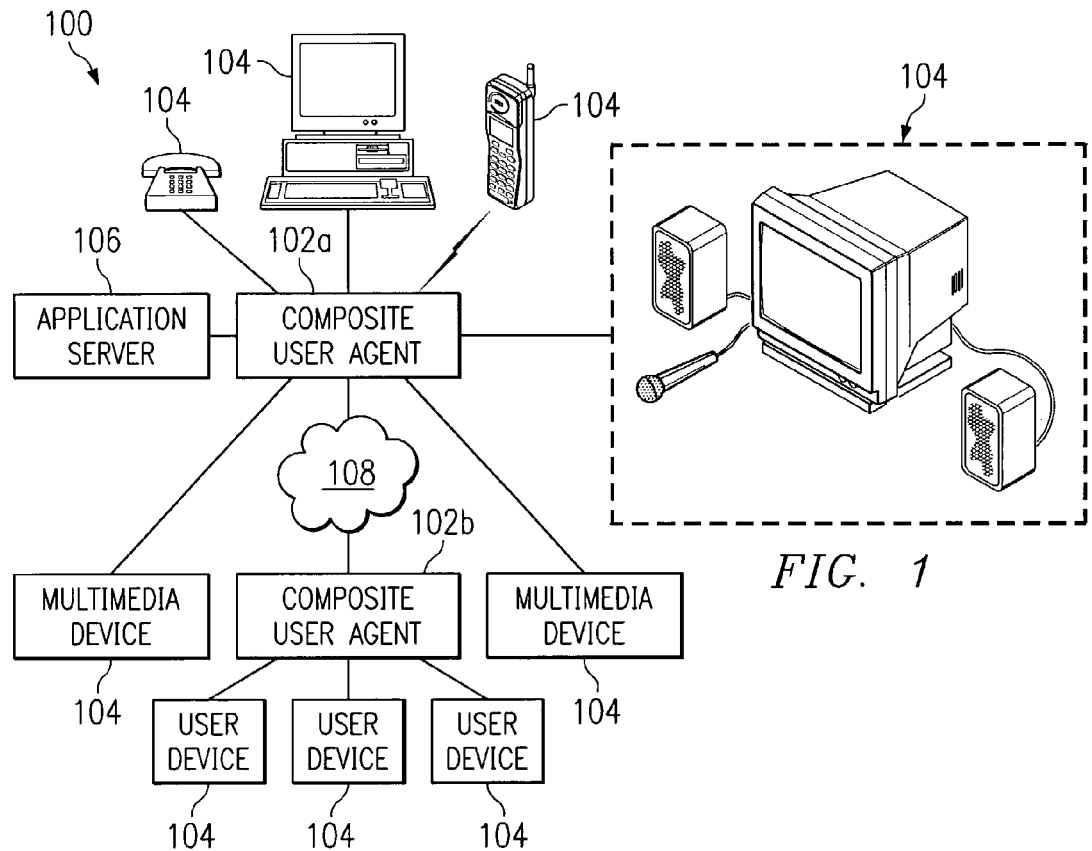
FIG. 1 shows a communication system according to one embodiment of the present invention.

FIG. 1 shows a communication system 100 that includes composite controllers (CCs) 102a and 102b (referred to collectively as "CCs 102") that manage communication sessions with endpoints 104. Composite controller 102 establishes a master multimedia session with one or more other user agents, whether composite or otherwise. CC 102 establishes delegated media sessions between endpoints 104 and associates them with the master multimedia session so that each separate endpoint 104 handles the appropriate type of media while the control of each session is handled by composite controller 102. Composite controller 102 thus allows different media types in a single multimedia session controlled by CC 102 to terminate on different endpoints 104. Endpoints 104 whose media sessions are managed by CC 102 are known as "docked endpoints." Docked endpoints 104 may be docked in a relatively permanent manner, so that all communications for a docked endpoint 104 are managed by CC 102. Alternatively, endpoints 104 may be docked selectively from a collection of endpoints associated with CC 102 as needed, so that a particular endpoint 104 engages in self-managed media sessions unless the endpoint 104 is docked by CC 102. Such endpoints 104 are termed "available endpoints."

The term "multimedia session" refers broadly to any exchange of multiple media types, and includes both the exchange of media and any associated exchange of control or signaling information for managing each media exchange. Media types may include voice, video, data, or any other suitable form of information. Exchanges of information may take place according to any suitable protocol that permits endpoints 104 to establish independent media sessions with other endpoints 104. Protocols may include session initiation protocol (SIP) as well as any other peer-to-peer, distributed, or other suitable communication protocol. In the multimedia session, CC 102 handles signaling and/or control information for media exchanges between docked endpoints 104 and other devices. Because the media exchanges are controlled by CC 102, they are referred to as delegated media sessions. CC 102 may also handle particular types of media using a local application, which is referred to as a "local media session."

Composite controller (CC) 102 refers to any hardware and/or software that establishes master multimedia sessions. In a master multimedia session, CC 102 manages multiple media sessions and assigns various exchanges of media in the multimedia session to one or more delegated sessions. CC 102 maintains information on available endpoints 104 coupled to CC 102 so that when it receives a multimedia request, CC 102 may determine a variety of available endpoints 104 to which sessions may be delegated. CC 102 may also include suitable hardware, software, or other components or applications that process one or more of the media types in the multimedia session. For example, CC 102 may delegate voice and video to suitable endpoints 104 and directly handle data exchanges, such as instant messaging applications. In managing individual media sessions, CC 102 may exchange signaling and/or control information with individual endpoints 104 or alternatively with a remote CC 102 that manages media sessions for a corresponding collection of endpoints 104.

Endpoints 104 refer to any device, application, hardware, and/or software for exchanging one or more types of media with other endpoints 104. For example, endpoints 104 may include analog, digital, or Internet protocol (IP) telephones, personal computers, video-conferencing equipment, wireless communication devices, personal digital assistants (PDAs), software applications, or any other suitable device or application. In a particular embodiment, endpoints 104 are equipped to negotiate communication sessions with other devices using SIP.

Application server 106 represents any server, processor, computer, or other suitable component for managing CC 102. Application server 106 provides a user interface for CC 102 that allows a user to initiate multimedia sessions, perform any suitable configuration of CC 102, or any other suitable control or management tasks. Application server 106 may include any suitable input or output devices, examples of which include keyboards, mice, graphical user interfaces (GUIs). By providing a control interface for CC 102, certain embodiments of application server 106 allow a user to manage multiple media devices as if they were a single multimedia device.

In operation, CC 102 receives a request for a communication session involving one or more media types. CC 102 identifies the media type in the communication request, and based on the media types, CC 102 identifies available endpoints 104 with the capability of processing each type of media. CC 102 may also handle particular media types directly in a local media session. CC 102 may reply to the sender of the communication request with an indication that CC 102 is attempting to establish the session while CC 102 attempts to initiate a delegated media session with the selected endpoints 104. To establish a delegated media session, CC 102 establishes a control connection with endpoint 104 allowing CC 102 to control the exchange of media by endpoint 104. Once the delegated media sessions are established with endpoints 104, CC 102 establishes a master multimedia session with the sender of the communication request. Endpoints 104 then exchange media in delegated sessions managed by CC 102, while CC 102 exchanges media in local media sessions.

CC 102 may also initiate multimedia sessions. A user of CC 102 initiates a request for multimedia communications. In response to the request, CC 102 determines what media types are available for delegated or local media sessions by referring to stored information or by querying available endpoints 104 to determine their capabilities. Once the available media types have been ascertained, CC 102 communicates a multimedia session request to a selected destination or destinations that includes requests for each of the selected media types. If the communication request is accepted, CC 102 establishes any delegated sessions and local sessions so that endpoints 104 and/or CC 102 may begin exchanging media with destinations.

During a multimedia session, CC 102 may also add or remove particular types of media. For example, if users of endpoints 104 wish to exchange video, one of the users may communicate a video request. CC 102 receives the request to add a media type, determines whether the media may be handled in a delegated or local media session, and establishes the appropriate type of session. Similarly, CC 102 may delete a media type from the multimedia session by terminating the delegated session for that media type.

CC 102 may also receive requests from an endpoint 104 to initiate multimedia communications or to add media. In the case of a request for a multimedia session, CC 102 receives the request, recognizes that the request comes from an endpoint 104, and relays the communication request, possibly along with any other suitable media requests. For example, if CC 102 has additional instant messaging capabilities, CC 102 may request an instant message session along with a voice communication request. If the communication request is accepted, CC 102 establishes a delegated media session with the requesting endpoint 104 as well as any other appropriate local or delegated session, all of which are associated with a master multimedia session.

Figure 2:
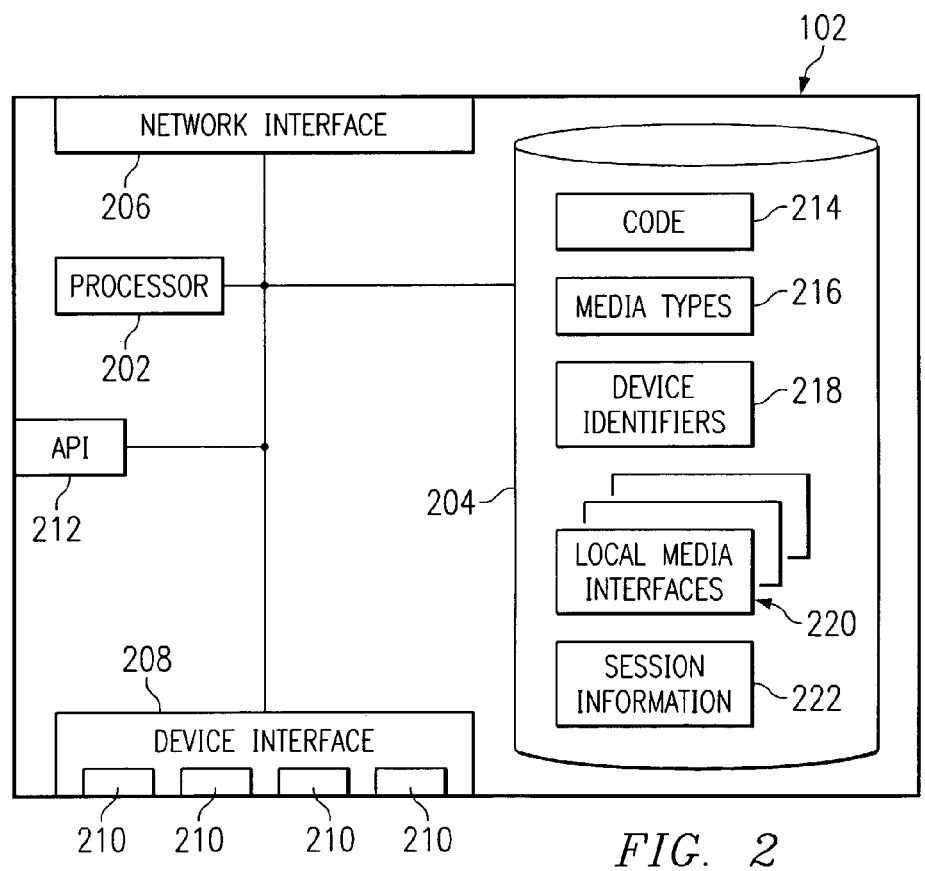
FIG. 2 shows a composite controller in the system of FIG. 1.

FIG. 2 shows a particular embodiment of CC 102 in greater detail. CC 102 includes a processor 202, a memory 204, and interfaces. Interfaces include a network interface 206, a device interface 208, and an application programming interface 212. Although interfaces are illustrated as separate components, it should be understood that the functions of interfaces may share the same hardware and/or software.

Processor 202 represents any hardware and/or software for processing information and performing any suitable tasks relating to the functions of CC 102. Processor 202 may include a microprocessor, microcontroller, digital signal processor (DSP), or any other suitable hardware and/or software. Memory 204 represents any information storage medium, whether volatile or nonvolatile, including magnetic media, optical media, local components, remote components, removable media, CD-ROMs, DVD-ROMs, or any other suitable form of information storage.

Interfaces represent any ports or connections, real or virtual, including any suitable hardware and/or software, that allow CC 102 to exchange information with other components of system 100. Network interface 206 exchanges information, which may include media and/or signaling or control information, with other CCs 102 or endpoints 104 that are not docked to CC 102. Device interface 208 exchanges information with endpoints 104 docked to CC 102. Device interface 208 includes ports 210, each of which corresponds to a real or virtual connection to one of the docked endpoints 104. CC 102 may identify the source of received information by the port 210 from which the information was received. Application programming interface (API) 212 represents a connection allowing application server 106 to control the operation of CC 102.

Memory 204 stores information used by CC 102 to establish and manage master multimedia sessions, delegated media sessions, and local media sessions. Code 214 represents instructions embodied in a computer-readable medium executed by processor 202 to perform various tasks. Media types 216 indicate the various types of media that may be handled by CC 102 and its associated endpoints 104. Device identifiers 218 uniquely identify endpoints 104 available for docking. Media types 216 and device identifiers 218 may be interrelated in a table or map that associates each media type with one or more devices that handle that media type. Local media interfaces 220 represent instructions for handling particular types of media sessions locally at CC 102. Session information 222 maintains records of active master multimedia sessions, delegated media sessions, and local media sessions, as well as maintaining the association between local and delegated sessions and their respective master sessions.

In operation, CC 102 establishes and manages master multimedia sessions and associated delegated and local media sessions. Upon receiving a request for a multimedia session from network interface 206, CC 102 first identifies the media types requested by comparing the request to media types 216 stored in memory 204. If a particular media type is not found in media types 216, CC 102 may return an error message to the caller using network interface 206. For media types that are found in memory 204, CC 102 establishes media sessions for each media type.

To establish media sessions, CC 102 first consults device identifiers 218 and local media interfaces 220 to determine an available resource for handling each type of media. CC 102 establishes local media sessions for media types supported by local media interfaces 220, and identifies those sessions by storing appropriate information in session information 222. CC 102 contacts endpoints 104 using device interface 208 to request media sessions with endpoints 104 capable of handling the remaining media types. If the request is successful, CC 102 establishes a delegated media session with the selected endpoints 104, and updates session information 222 to reflect the new delegated sessions. Once all of the media types are allocated to a delegated or local session, CC 102 establishes a master multimedia session with the sender of the multimedia communication request, and updates session information 222 so that the delegated and local media sessions are associated with the master session. CC 102 may also receive various commands, including requests to initiate multimedia sessions with other CCs 102 or endpoints 104, from API 212.

Figures 3, 5:
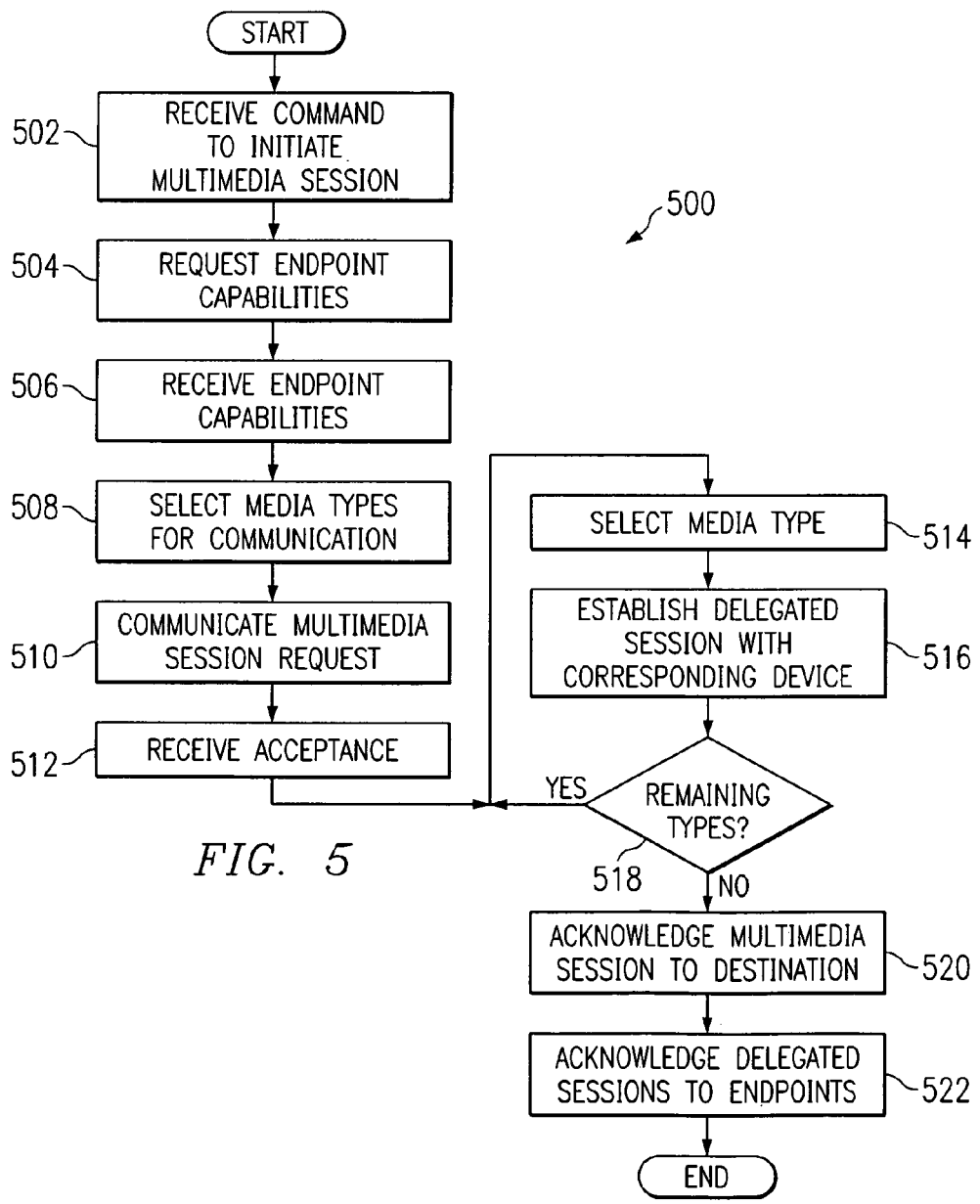
FIG. 3 shows an example of a table of session information that may be stored by the composite controller of FIG. 2.
FIG. 5 is a flow chart showing an example of a method for initiating a multimedia session at the composite controller.

FIG. 3 shows a table 300 that CC 102 may use to organize information about endpoints 104, media types 216, and session information 222. Table 300 associates information organized into four columns. Column 302 lists available devices for handling media sessions, as identified by any suitable identifier. In the depicted embodiment, devices are identified by an Internet protocol (IP) address. Endpoint IP addresses 310 identify a destination address corresponding to a particular endpoint 310. Local address 312 represents the IP address for CC 102 itself.

Media types 304 indicate the device address with which each particular media type 304 is associated. For example, if instant message applications are handled by CC 102, the particular media type 304 "instant message" is associated with local address 302. Multiple devices may be associated with each media type, so that CC 102 may establish media sessions with any or all available media devices as needed or desired. Similarly, a particular device may be able to handle multiple types of media. CC 102 may use the information in media type column 304 and device address column 302 to determine a particular device to handle each media type in a multimedia communication request.

Active session identifiers 306 may be assigned according to any suitable arrangement, such as the order in which the sessions are initiated. As new sessions are established and existing sessions are terminated, CC 102 updates active session column 306 to reflect the changes. Devices with no active media session may be assigned the value zero or otherwise be listed as inactive.

Master session identifiers 308 represent identifiers for master multimedia session associated with each active media session 306. For example, in a media session that involves both voice and video, both media session identifiers 306 may be associated with the same master session identifier 308. Again, as associated media sessions are initiated or terminated, CC 102 updates column 308 to reflect the new associated media sessions.

Although a particular embodiment of table 300 has been illustrated, it should be understood that CC 102 may use additional or different information to establish and manage media sessions, and such organization may be organized in any suitable format. For example, information may be organized in a relational database or other information format. Rather than keeping a persistent record of device capabilities, CC 102 may discover the available communication resources upon receiving a new communication request from API 212 or a docked endpoint 104, thus allowing the information to be kept current as devices are added to and removed from CC 102. The particular identifiers used for devices and media sessions may vary as well. Such variations do not interfere with the basic operation of CC 102.

Figure 4:
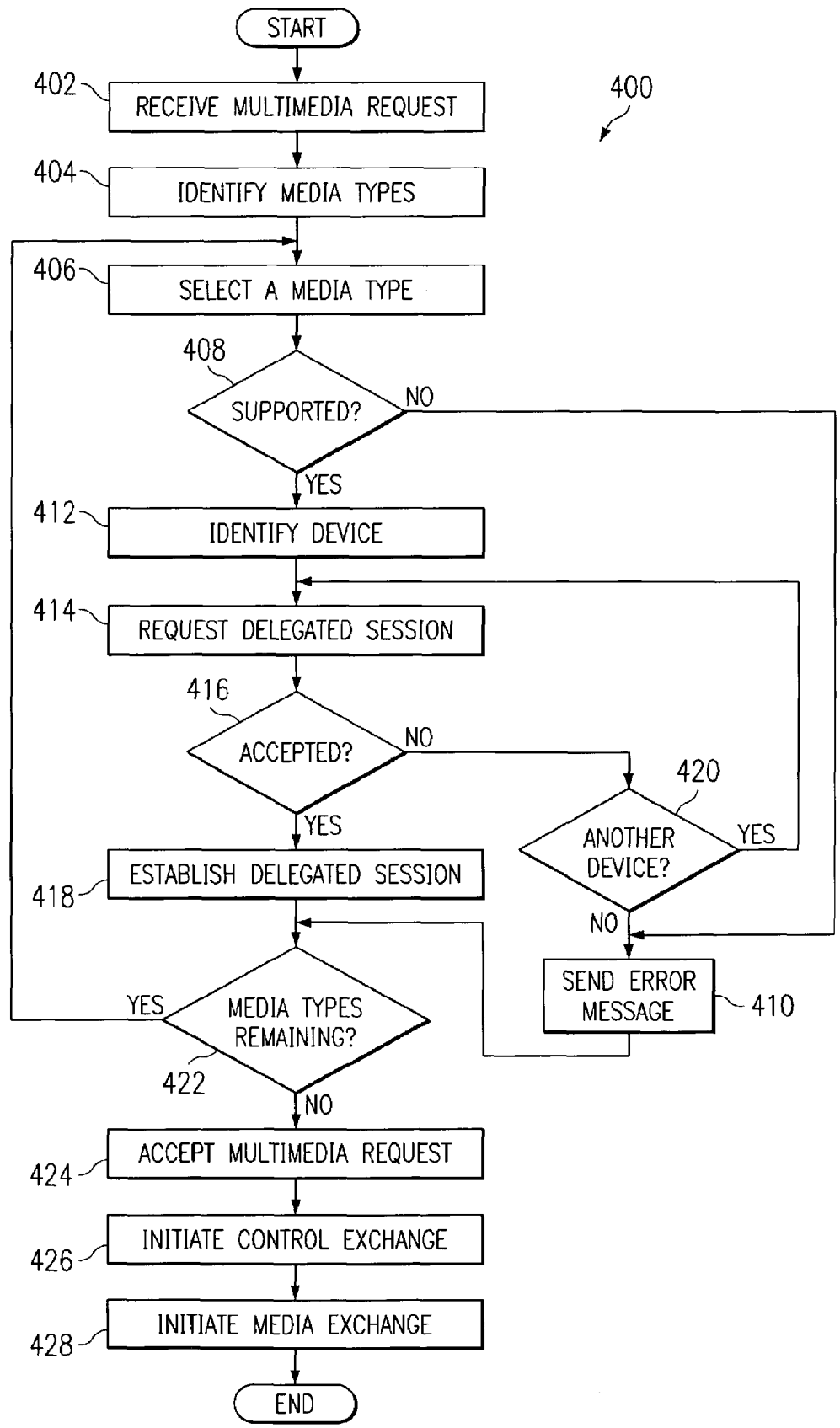
FIG. 4 is a flow chart showing one example of a method for initiating a multimedia session at a user agent in response to a request.

FIG. 4 is a flow chart 400 illustrating one example of a method for initiating a multimedia session in response to communication request using CC 102. CC 102 receives a request to initiate a multimedia communication session from a sender at step 402. CC 102 identifies the media types for the multimedia request at step 404. CC 102 selects one of the media types at step 406, and determines if that media type is supported at step 408. If the selected media type is not supported, then CC 102 may return an error message to the sender of the communication request at step 410. If the selected media type is supported, CC 102 goes on to establish a media session for that media type.

To establish the media session, CC 102 determines a device supporting the media type at step 412. This device may be an available endpoint 104 or may be a local media handler running on CC 102 itself. CC 102 then requests a delegated session that will be controlled by CC 102 at step 414. In the case of local media sessions, CC 102 may initiate the application at this step 414. CC 102 then determines if the request for the delegated session is accepted at step 416. If the request is accepted, CC 102 establishes the delegated session with the device at step 418. If the request is rejected, either because of error or failure in the communication device or for any other reason, CC 102 attempts to locate another device to support the media type at step 420. If another device is located, CC 102 attempts to establish a media session with that device from step 414. Otherwise, CC 102 determines that the media type is unsupported and sends an error message at step 410.

After the media session for a selected media type is established, CC 102 determines whether there are any remaining media types that are not assigned to a media session at step 422. If there are remaining media types, CC 102 continues establishing media sessions for the media types from step 406. Otherwise, CC 102 establishes the master multimedia session with the destination.

At step 424, CC 102 communicates an acceptance of the multimedia communication request. The acceptance may include error messages or other indications that particular media types are unsupported. CC 102 initiates exchange of control information for the delegated sessions at step 426, and based on the control information, initiates media exchange between devices at step 428.

FIG. 5 is a flow chart 500 showing a user-initiated request for CC 102 to establish a multimedia session with a destination. CC 102 receives a command to initiate a multimedia session at step 502. The request may be user-initiated through API 212 or by an endpoint 104, such as when a caller lifts the handset of a telephone and dials a number. Alternatively, the request may be initiated automatically by a subroutine of CC 102, an application on application server 106, or any other suitable controller. The user or initiator of the communication request may specify particular media types or may allow the media types to be selected by default, by the types of media that CC 102 can handle, or by any other suitable method. The request to initiate communications also includes a destination for the communication connection.

In one embodiment, CC 102 determines the available media types by requesting endpoint 104 capabilities at step 504. CC 102 receives the capabilities of any docked devices at step 506. In alternative embodiments, the initiator of the request for a multimedia session may specify media types, the media types may be selected by default, or the media types may be ascertained by communicating with the destination to determine supported media types on the other end of the communication. In general, CC 102 may use any appropriate method for selecting media types.

Once CC 102 determines available media types through any of the described methods and selects the media type for communication at step 508, CC 102 communicates a request for a multimedia session to the requested destination at step 510. If CC 102 receives an acceptance at step 512, CC 102 selects the media type at step 514 and establishes delegated or local media sessions controlled by CC 102 at step 516. CC 102 continues to establish media sessions, represented by the flow from decision step 518, until all media types have been associated with a respective media session. Once the media sessions are established, CC 102 acknowledges the multimedia session to the destination at step 520, and acknowledges the individual delegated sessions to their respective devices at step 522. Devices then may begin to exchange media in local and delegated media sessions controlled by CC 102.

Figure 6:
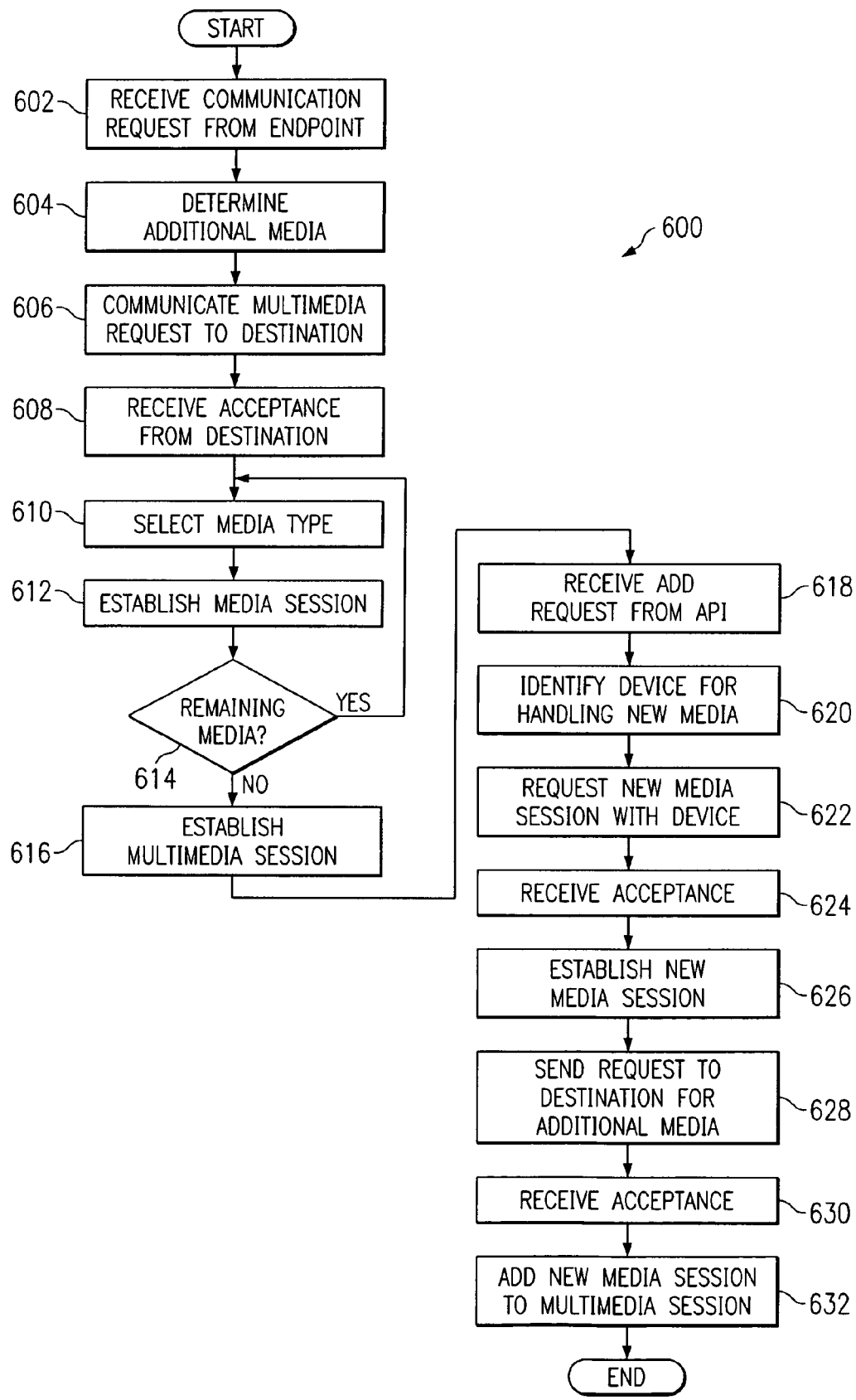
FIG. 6 is a flow chart showing an example of a method for initiating a multimedia session at a device docked to the composite controller.

FIG. 6 is a flow chart 600 showing one example of a method for initiating a multimedia session from device docked to CC 102 and for adding new media types to an existing multimedia session. CC 102 receives a request to initiate a communication connection with a destination from docked endpoint 104 at step 602. CC 102 determines what additional media are available for the communication at step 604. Alternatively, the user of docked endpoint 104 may specify certain media types as part of the communication request. Once the media types are determined, CC 102 communicates a multimedia session request to the selected destination at step 606. CC 102 then receives an acceptance from the destination at step 608.

For each requested media type, CC 102 then establishes delegated or local media session. CC 102 selects a media type at step 610. CC 102 establishes the delegated or local media session at step 612. Decision step 614 continues the cycle of establishing media sessions until all of the media types for the multimedia session are associated with a media session. When all of the media sessions are established, CC 102 establishes the master multimedia session with the destination at step 616.

During the multimedia session, CC 102 may add one or more types of media to the multimedia session. An add or drop request for a media type may be received directly from a user, such as via API 212, or from a remote device via network interface 206. The following description gives an example of receiving a add request from a user of CC 102, but in general, add or drop requests may be received in any suitable manner. CC 102 receives a request to add media from API 212 at step 618. CC 102 identifies a device, whether local or docked, to handle the media type at step 620. CC 102 then establishes a media session with the device in steps 622-626.

At step 622, CC 102 requests a new delegated session with the selected device. CC 102 receives an acceptance from the selected device at step 624 and establishes a delegated session with the device at step 626. CC 102 then sends a request to add new media using the communication connection of multimedia session at step 628. CC 102 receives an acceptance from the destination at step 630, and associates the new media session with the master multimedia session at step 632. If the add request from API 212 includes multiple media types, CC 102 may repeat steps 620 through 632 for each additional media type.

In certain cases, a destination device or docked device may refuse a request for a communication connections due to failure, inability to support selected media, or other appropriate reason. In such cases, CC 102 may send an error message to the party attempting to add media to the existing multimedia session, whether that party is the user of CC 102 or the user of a destination CC 102 or endpoint 104.

FIGS. 7-9 are call flow diagrams that illustrate examples of the operation of CC 102 in a SIP environment, and in particular, the SIP messages that CC 102 exchanges with other devices. The SIP term "user agent" refers to an endpoint 104 handling a particular media type. FIG. 7 shows an example of a call flow 700 for an incoming multimedia call to a particular embodiment of CC 102 that uses SIP. Call flow 700 involves a source user agent (source UA) 702 sending a multimedia request to a composite controller (CC) 704 with two docked devices: a voice delegated user agent (voice delegated UA) 706 and a video delegated user agent (video delegated UA) 708. Source UA 702 represents another endpoint 104 or CC 102 with which CC 704 communicates. "Source" refers to the fact that UA 702 is the originator of the request to initiate the multimedia session; UA 702 may also be referred to as a "destination UA" 704 when receiving a request to initiate a multimedia session from CC 704.

From source UA 702, CC 704 receives an invite message 710 for a multimedia session involving three media types: voice, video, and instant message. CC 704 responds with a provisional "trying" response 711 while CC 704 attempts to establish the appropriate delegated sessions for voice and video. In the depicted embodiment, CC 102 handles instant message media locally.

To establish the delegated voice session, CC 704 sends an invite message 712 to voice delegated UA 706. Voice delegated UA 706 responds with an acceptance (OK) 714, and CC 704 returns an acknowledgement (ACK) 716 that OK 714 was received. Once the acceptance is acknowledged, the delegated voice session is considered established. To establish the delegated video session, CC 704 sends an invite 718 to delegated video UA 708, receives an OK 720 in response, and acknowledges OK 720 with an ACK 722. This establishes the delegated video session.

Once the delegated sessions are established, CC 704 updates its provisional response by sending an OK 724 for the multimedia session to source UA 702. Source UA returns an ACK 726, thus establishing the multimedia session between source UA 702 and CC 704. Source UA 702 then exchanges media with the appropriate destination UAs. Voice media stream 728 is communicated to voice delegated UA 706, while CC 704 handles associated signaling and/or control information associated with voice media stream 728. Video media stream 730 is similarly communicated to video delegated UA 708. Instant message media stream 732 is handled locally by CC 704, so instant message media stream 732 terminates on CC 704.

FIG. 8 shows an example of a call flow 800 for a multimedia call initiated by CC 704 in response to a command received from API 212 or other suitable method of receiving commands. In response to receiving the command to initiate a multimedia session, CC 704 determines availability of devices by communicating "no media offer" messages 802 and 810 requesting verification of capabilities. Voice delegated UA 706 responds with a voice OK 804 indicating that it supports voice media while video delegated UA 708 responds with a video OK 812. CC 102 acknowledges voice OK 804 and video OK 812 with ACK messages 806 and 814 to each device. ACK messages 806 and 814 also include a hold request to indicate that UAs 706 and 708 should wait in standby mode for a media session to be established.

After CC 704 ascertains the capabilities of docked UAs 706 and 708, CC 704 communicates an invite message 816 to destination UA 702 (called "destination UA" because it is receiving a request to initiate a multimedia session). The invite message may include any media types corresponding to the media capabilities previously determined as well as any media types supported by CC 704 such as instant messaging in the depicted embodiment. Destination UA responds to the request with an OK 818 for all of the media types in the request, as described above in conjunction with FIG. 7. In response to OK 818, CC 704 sends an invite message 820 to voice delegated UA 706 and an invite message 822 to video delegated UA 708 in order to establish media sessions with these devices. Voice delegated UA 706 responds with a voice OK 824, while video delegated UA 708 responds with a video OK 826. CC 704 may check to make sure that voice OK 824 and video OK 826 match voice OK 804 and video OK 812 from the capabilities check. If they do not match, CC 704 may determine that the actual capabilities of CC 704 do not match the capabilities indicated in invite message 816 to destination UA 702, in which case it may be necessary to fail part or all of the attempted multimedia connection or to take other remedial action.

Assuming the media sessions all match up properly, CC 704 then acknowledges the multimedia session to destination UA by communicating ACK message 828. CC 704 also acknowledges the delegated media sessions to voice delegated UA 706 and video delegated UA 708 by communicating ACK messages 830 and 832. Once all of the appropriate multimedia and delegated sessions are accepted and acknowledged, instant message media stream 834, voice media stream 836, and video media stream 838 are established between destination UA 702 and the respective device handling each media type.

FIG. 9 is an example of a call flow 900 for a multimedia session initiated by a docked device that includes adding media during the call. In the embodiment depicted, voice delegated user agent 706 sends a voice invite message 902 intended for a destination UA 702 to CC 704. CC 704 identifies the invite message 902 as being intended for destination UA 702, and also determines any additional media that may be desirable for the call. CC 704 may make this determination based on invite message 902 itself or based on an internal determination of its own capabilities and/or capabilities of docked devices. In the embodiment depicted, CC 704 determines that instant messaging, a type of media supported by CC 704, will be added to voice invite message 902.

Once the media for the multimedia request have been determined, CC 704 communicates a multimedia invite 904 to destination UA 702. Destination UA 702 responds with a multimedia OK message 906, which CC 704 then acknowledges with an ACK message 908. CC 704 also accepts the original voice invite message 902 from voice delegated UA 706 with a voice OK 910, thus establishing a delegated voice session with voice delegated UA 706. Voice delegated UA 706 acknowledges the delegated voice session with an ACK message 912. Instant message media stream 916 and voice media stream 914 are then established between the respective devices for those media types.

During the multimedia call, CC 704 receives a request 918 to add video from API 212. In response to request 918, CC 704 sends a "no media offer" message 920 to video delegated UA 708 to verify its video capabilities. Video delegated UA responds with a video OK 922, and CC 704 acknowledged video OK 922 with an ACK message 924 that puts video delegated UA 708 on hold while video is added to the multimedia session.

Once the video delegated session is established, CC 704 communicates an invite request 929 to destination UA 702 that includes voice and instant message from the original multimedia session as well as video. Destination UA 702 returns a multimedia OK 928 that specifies the media types that will be used in the multimedia session. Sometimes, destination UA 702 may request a different media type in the response, such as when destination UA 702 supports one type of voice media in voice communications and a different type of voice media in videoconferences. As shown in block 930, CC 704 may then re-invite voice delegated UA 902 into a voice session supporting the new type of voice, and if the new type of voice is unsupported, CC 704 may fail the attempt to add video.

Assuming that all media in multimedia OK 928 are supported, CC 704 may add video to the multimedia session. CC 704 sends a video invite message 932 to video delegated UA 708, and video delegated UA 708 response with a video OK 934. If video OK 934 does not match video OK 922, CC 702 may determine that the video type communicated in multimedia invite 929 is unsupported and may fail the attempt to add video as shown in block 936. Otherwise, CC 702 acknowledges the delegated video session to video delegated UA 708 with ACK message 940, and acknowledges the new multimedia session, including video, to destination UA 702 with ACK message 938. Destination UA 702 then exchanges video with video delegated UA 708 using video media stream 942.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for managing a multimedia session at a user location, comprising:

receiving a request at a user location to initiate a multimedia session, the multimedia session having first media and second media;

establishing a first delegated session with a first device at the user location to communicate the first media;

establishing a second delegated session with a second device at the user location to communicate the second media;

establishing a master multimedia session with a sender of the request, the master multimedia session handling control information associated with the first delegated session and the second delegated session, wherein establishing a master multimedia session comprises establishing a master multimedia session with a remote device, the remote device communicates first media with the first device and second media with a second device;

associating the first delegated session with the master multimedia session, wherein the first delegated session controls the first media in the multimedia session; and associating the second delegated session with the master multimedia session, wherein the second delegated session controls the second media in the multimedia session.

2. The method of claim 1, wherein:
the first media is voice; and
the second media is instant messaging.

3. The method claim 1, wherein the remote device:
establishes a third delegated session to a third device at the user location to communicate first media with the first device; and
establishes a fourth delegated session to a fourth device at the user location to communicate second media with the second device.

4. The method of claim 1, wherein:
the steps of the method are performed by a composite controller; and
the method further comprises outputting the second media to a user by executing an application of the composite controller.

5. The method of claim 1, wherein the request is received from an application programming interface.

6. A method for managing a multimedia session at a user location, comprising:
receiving a first invite command at a user location to initiate a multimedia session having first media and second media;
communicating a second invite command to establish a first delegated session with a first device at the user location to communicate first media; and
establishing a master multimedia session with a remote device, the master multimedia session handling control information associated with the first delegated session, wherein the remote device communicates first media with the first device and second media with a second device;
associating the first delegated session with the master multimedia session, wherein the first delegated session controls the first media in the multimedia session.

7. The method of claim 6, wherein:
the first media is voice; and
the second media is data.

8. The method of claim 6, wherein the remote device:
establishes a second delegated session to a third device at the user location to communicate first media with the first device; and
establishes a third delegated session to a fourth device at the user location to communicate second media with the second device.

9. The method of claim 6, wherein the first invite is received from an application programming interface.

10. The method of claim 6, wherein:
the invite messages have a format specified by a communication protocol; and
the communication protocol comprises a peer-to-peer protocol allowing one or more communication devices to establish communication sessions with one another.

11. A computer readable medium storing logic operable to:
receive a request at a user location to initiate a multimedia session, the multimedia session having first media and second media;

establish a first delegated session with a first device at the user location to communicate the first media;
establish a second delegated session with a second device at the user location to communicate the second media; and
establish a master multimedia session with a sender of the request, the master multimedia session handling control information associated with the first delegated session and the second delegated session, wherein establishing a master multimedia session comprises establishing a master multimedia session with a remote device, the remote device communicates first media with the first device and second media with a second device;
associate the first delegated session with the multimedia session, wherein the first delegated session controls the first media in the multimedia session;
associate the second delegated session with the master multimedia session, wherein the second delegated session controls the second media in the multimedia session.

12. A method for managing a multimedia session at a user location, comprising:
providing a composite controller at a user location running session initiation protocol and a communication device docked to the composite controller;
exchanging first session initiation protocol messages between the composite controller at the user location and one or more remote devices to establish a multimedia session comprising at least two media types with the one or more remote devices;
exchanging second session initiation protocol messages with the communication device at the user location to establish a delegated media session comprising at least one media type selected from the at least two media types;
establishing a master multimedia session with the one or more remote devices, the master multimedia session handling control information associated with the delegated media session;
associating the delegated media session with the master multimedia session, wherein the delegated session controls the at least one media type in the multimedia session; and
wherein the one or more remote devices communicate the at least one media type with the communication device and a second media type with a second device.

13. The method of claim 12, wherein exchanging the first session initiation protocol messages comprises:
communicating a session initiation protocol invite message for the delegated media session to the communication device;
receiving from the communication device a session initiation protocol OK message for the delegated media session; and
communicating an acknowledgement of the OK message to the communication device.

14. The method of claim 12, wherein exchanging the second session initiation protocol messages comprises:
communicating a session initiation protocol invite message for the master multimedia session; and
receiving a session initiation protocol OK message for the master multimedia session.

15. The method of claim 12, wherein:
exchanging the first session initiation protocol messages comprises:

receiving a first session initiation protocol invite message for the delegated media session from the communication device; and communicating a first session initiation protocol OK message; and exchanging the second session initiation protocol messages comprises:

in response to receiving the first session initiation protocol invite message, selecting one or more additional media types for the master multimedia session;

communicating a second session initiation protocol invite message for the master multimedia session to the one or more remote devices; and receiving a second session initiation protocol OK message in response to the second session initiation protocol invite message, wherein the first session initiation protocol OK message is communicated in response to receiving the second session initiation protocol OK message.

16. A method for managing a multimedia session at a user location, comprising:

receiving a request at a user location to initiate a multimedia session, the multimedia session having first media and second media;

establishing a first delegated session with a first device at the user location to communicate the first media;

establishing a master multimedia session with a remote device, the master multimedia session handling control information associated with the first delegated session;

associating the first delegated session with the master multimedia session, wherein the first delegated session controls the first media in the multimedia session;

wherein the remote device communicates first media with the first device and second media with a second device.

* * * * *

UNITED STATES PATENT AND TRADEMARK OFFICE
CERTIFICATE OF CORRECTION

PATENT NO. : 7,532,628 B2 Page 1 of 1
APPLICATION NO. : 10/334546
DATED : May 12, 2009
INVENTOR(S) : Michael P. Lepore et al.

It is certified that error appears in the above-identified patent and that said Letters Patent is hereby corrected as shown below:

Title page, (75) Inventors, after Paul H. Ryzivat, insert the following:
--Daniel L. Schauer, Chelmsford, MA.--

Signed and Sealed this

Thirtieth Day of June, 2009

JOHN DOLL
*Acting Director of the United States Patent and Trademark Office*